(12) United States Patent
Datta et al.

(10) Patent No.: US 11,283,345 B2
(45) Date of Patent: *Mar. 22, 2022

(54) MULTI-SWITCH VOLTAGE REGULATOR

(71) Applicant: TEXAS INSTRUMENTS INCORPORATED, Dallas, TX (US)

(72) Inventors: Kishalay Datta, West Bengal (IN); Vinod Menezes, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,618

(22) Filed: Apr. 12, 2021

(65) Prior Publication Data

US 2021/0234456 A1 Jul. 29, 2021

Related U.S. Application Data (63) Continuation of application No. 16/039,644, filed on Jul. 19, 2018, now Pat. No. 10,978,944.

(60) Provisional application No. 62/612,352, filed on Dec. 30, 2017.

(30) Foreign Application Priority Data

Jul. 20, 2017 (IN) .............................. 201741025729

(51) Int. Cl.
| H02M 3/07 | (2006.01) |
|---|---|
| H02M 1/08 | (2006.01) |
| G06F 1/26 | (2006.01) |
| G06F 1/3296 | (2019.01) |
| G06F 1/30 | (2006.01) |
| H02M 3/00 | (2006.01) |
| H02M 1/00 | (2006.01) |

(52) U.S. Cl.
CPC .................. *H02M 1/08* (2013.01); *G06F 1/26* (2013.01); *G06F 1/30* (2013.01); *G06F 1/3296* (2013.01); *H02M 3/00* (2013.01); *H02M 1/009* (2021.05); *H02M 1/0045* (2021.05)

(58) Field of Classification Search
CPC .......... H02M 1/009; H02M 3/00; H02M 1/08; H02M 1/0045; G06F 1/26; G06F 1/3296; G06F 1/30; Y02D 10/00
See application file for complete search history.

(56) References Cited

U.S. PATENT DOCUMENTS

| 7,907,429 B2 | 3/2011 | Ramadass et al. |
|---|---|---|
| 8,860,396 B2 * | 10/2014 | Giuliano ............... H02M 3/158 323/288 |
| 11,133,742 B2 * | 9/2021 | Zhang .................. H02M 3/1588 |
| 2005/0001597 A1 * | 1/2005 | Walters .................... H02J 1/102 323/222 |
| 2005/0068014 A1 | 3/2005 | Dillon et al. |

(Continued)

*Primary Examiner* — Jared Fureman
*Assistant Examiner* — Esayas G Yeshaw
(74) *Attorney, Agent, or Firm* — Michael A. Davis, Jr.; Charles A. Brill; Frank D. Cimino (57) ABSTRACT

In some examples, a voltage regulator includes a first pair of switches controllable by a first clock signal having a first phase. The switches in the first pair are coupled to each other via a capacitor. The voltage regulator also includes a second pair of switches controllable by a second clock signal having a second phase. The first and second phases are non-overlapping. The switches in the second pair are coupled to each other via the capacitor.

8 Claims, 6 Drawing Sheets

(56) References Cited

U.S. PATENT DOCUMENTS

| | | | |
|---|---|---|---|
| 2009/0072800 A1* | 3/2009 | Ramadass | H02M 3/1584 323/271 |
| 2009/0174389 A1 | 7/2009 | Osburn | |
| 2010/0127679 A1* | 5/2010 | Satterfield | G06F 1/06 323/282 |
| 2013/0007473 A1* | 1/2013 | van der Lee | G06F 1/206 713/300 |
| 2015/0249403 A1* | 9/2015 | Sato | H02M 7/25 363/127 |
| 2017/0063223 A1* | 3/2017 | Raghupathy | G05F 1/56 |
| 2018/0123599 A1 | 5/2018 | Chen | |

\* cited by examiner

MULTI-SWITCH VOLTAGE REGULATOR

CROSS-REFERENCE TO RELATED APPLICATIONS

This application is a continuation of U.S. patent application Ser. No. 16/039,644 filed Jul. 19, 2018, which claims priority to U.S. Provisional Patent Application No. 62/612,352 filed Dec. 30, 2017 and Indian Provisional Patent Application No. 201741025729 filed Jul. 20, 2017, all of which are hereby incorporated herein by reference.

BACKGROUND

Various power management system designs are available to supply power in differing applications. Some applications require their power supplies to provide multiple voltage domains (with each "voltage domain" providing a distinct voltage), such as a first domain that provides 12V, a second domain that provides 5V, and a third domain that provides 2V. Such applications are designed with the expectation that the multiple voltage domains will continue to be available regardless of instability in the applications, such as instability due to power supply fluctuations and changing load conditions.

SUMMARY

In at least one example, a voltage regulator includes a first pair of switches controllable by a first clock signal having a first phase. The switches in the first pair are coupled to each other via a capacitor. The voltage regulator also includes a second pair of switches controllable by a second clock signal having a second phase that is non-overlapping with the first phase. The switches in the second pair are coupled to each other via the capacitor.

In another example, a system includes a first unit cell comprising first switches to couple a first capacitor to outputs of the first unit cell in differing arrangements based on a trio of clock signals having non-overlapping phases. The system also includes a second unit cell comprising second switches to couple a second capacitor to outputs of the second unit cell in differing arrangements based on the trio of clock signals. An arrangement of the second switches with respect to the second capacitor is different than an arrangement of the first switches with respect to the first capacitor. The system also includes a third unit cell comprising third switches to couple a third capacitor to outputs of the third unit cell in differing arrangements based on the trio of clock signals. An arrangement of the third switches with respect to the third capacitor is different than the arrangement of the first switches with respect to the first capacitor and is different than the arrangement of the second switches with respect to the second capacitor. The system also includes a load assembly to configure loads to receive power from the first, second and third unit cells, based on an enabled mode of the system.

In yet another example, a method includes switchably coupling a first capacitor to a pair of decoupling capacitors via first and second pairs of switches. The method also includes switchably coupled a second capacitor to the pair of decoupling capacitors via third and fourth pairs of switches. The method further includes controlling the first and second pairs of switches using first and second clock signals having non-overlapping phases. The method further includes controlling the third and fourth pairs of switches, using the first and second clock signals, to couple the first and second capacitors to different ones of the decoupling capacitors.

DETAILED DESCRIPTION

Many systems-on-chip (SoCs) operate on multiple supply rails that provide multiple voltage domains. These supply rails are powered by embedded power supplies that use a single power source, such as a battery, to generate the multiple, distinct voltage domains. Such power supplies have numerous disadvantages. For example, many such supplies use bulky inductors that are difficult to integrate in small form-factor SoCs. Further, many such supplies draw high peak currents, resulting in reduced battery life. Further still, ever-increasing power demands frequently lead to significant distribution losses, power supply instability, and increased current requirements.

Described herein are various examples of a voltage regulator system that mitigates the disadvantages described above. In some examples, the voltage regulatory system receives a single battery supply voltage, and it outputs multiple voltage domains based on the single battery supply voltage. The voltage regulator system is configured to extend battery life by reducing the peak current draw on the battery. The voltage regulator system accomplishes such reduction with capacitors that are charged (i.e., by the battery supply voltage) and discharged in a round-robin fashion, such that only one (or less than a predetermined number) of the capacitors is charged at any given time. By charging only one (or a predetermined number) of capacitors at a time, the current drawn from the battery is constant or nearly constant, and current draw peaks are avoided, thus preserving the integrity of the battery, which is beneficial in low-power applications (e.g., mobile phones). Also, as the battery ages and provides a lower battery supply voltage, it may be preferable to adjust both the number of voltage domains provided by the voltage regulator system and the configuration of the load supplied by the voltage regulator system, such that all facets of the load continue to be supplied with adequate power. For example, when a new or freshly recharged battery is providing the battery supply voltage, a relatively large voltage is available, such as 12 V. This relatively large voltage can be evenly divided into multiple voltage domains, such that each voltage domain is large enough to supply its own load. However, as the battery discharges over time, the battery supply voltage decreases.

Thus, a smaller voltage is available, such as 5 V. This lowered voltage can still be evenly divided into multiple voltage domains, but each such voltage domain may no longer be large enough to supply its own load. Accordingly, the voltage regulator system enables different "modes," with the different modes triggering the dynamic implementation of different configurations of the voltage regulator system to power its load(s) despite decreases in battery supply voltage.

Figure 1A:
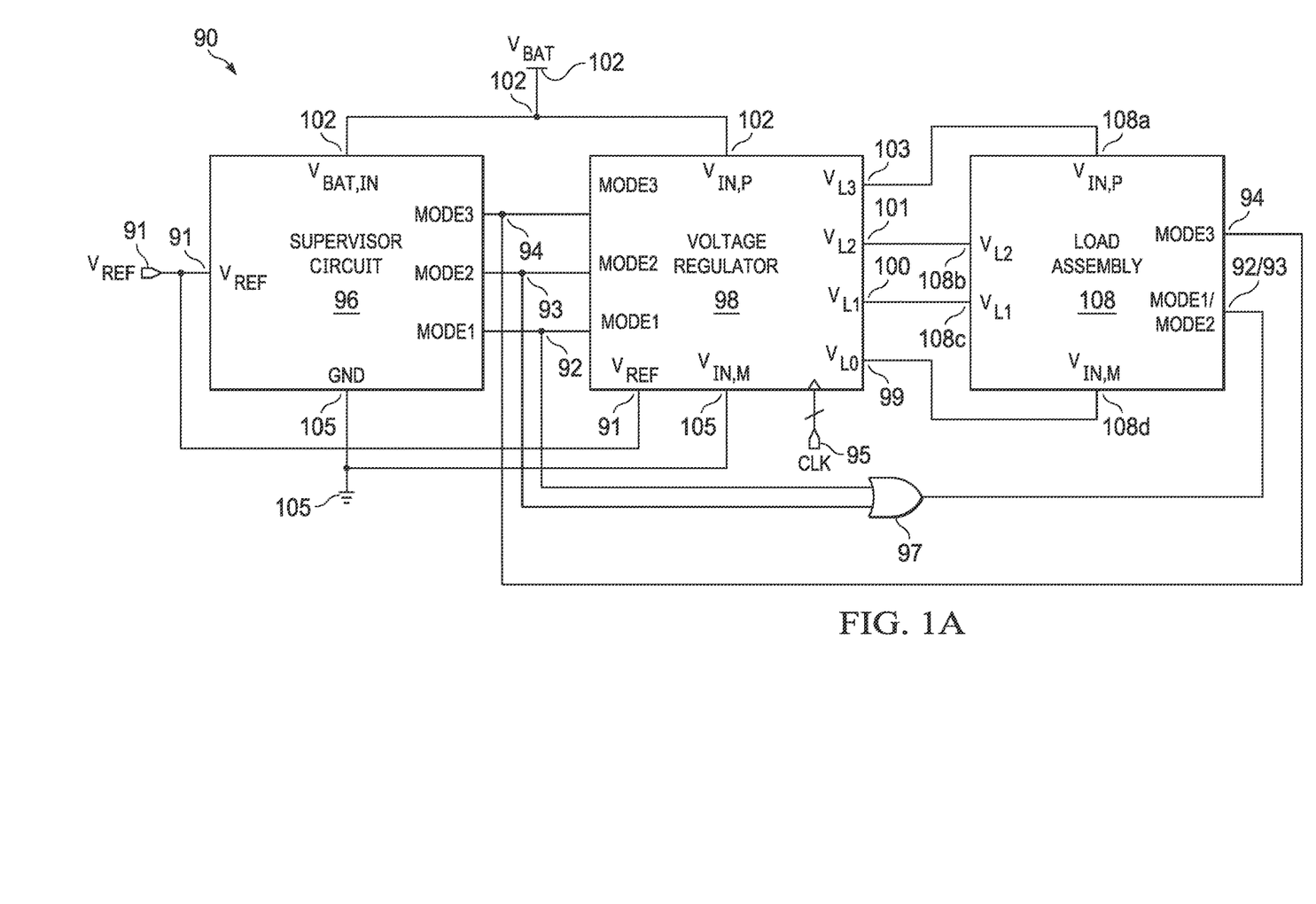
FIG. 1A is a circuit schematic diagram of an illustrative voltage regulator system in accordance with various examples.

FIG. 1A shows a circuit schematic diagram of an illustrative voltage regulator system 90 in accordance with various examples. The voltage regulator system 90 includes: a reference signal 91 (supplying, e.g., 1.2V); a supervisor circuit 96; an OR gate 97; a voltage regulator 98; a battery supply 102; a ground connection (GND) 105; and a load assembly 108. (Any connection depicted or described herein as carrying the battery supply 102 or GND 105 may be referred to as a power supply rail.) The supervisor circuit 96 outputs a mode 1 signal 92, a mode 2 signal 93, and a mode 3 signal 94. The supervisor circuit 96 receives a battery supply 102, the reference signal 91, and the GND 105. The voltage regulator 98 receives the mode 1 signal 92, the mode 2 signal 93, and the mode 3 signal 94. The voltage regulator 98 also receives an input clock signal (CLK) 95, the battery supply 102, a reference signal 91, and a ground 105. The voltage regulator 98 outputs an output voltage 99, an output voltage 100, an output voltage 101, and an output voltage 103.

The load assembly 108 comprises multiple loads (not specifically shown in FIG. 1A). The load assembly 108 receives the input voltage 100, the input voltage 101, the battery supply 102, and the ground 105. The load assembly 108 further receives the mode 3 signal 94 and a mode 2/mode 1 signal 93/92.

The battery supply 102 and the GND 105 provide voltage and ground connections to the supervisor circuit 96 and the voltage regulator 98. The reference signal 91 provides reference signals to the supervisor circuit 96 and the voltage regulator 98 and is provided by a reference, such as a bandgap reference. In some examples, the CLK 95 comprises multiple clock signals (e.g., three clock signals) with non-overlapping phases and, optionally, identical frequencies.

The voltage regulator system 90 operates in different modes. Each mode determines the internal configurations of the voltage regulator 98 and of the load assembly 108. The supervisor circuit 96 determines the mode in which the voltage regulator system 98 will operate at any given time. The supervisor circuit 96 determines the mode of operation based on a comparison of the received battery supply 102 and the reference signal 91, as described in detail below. According to the mode selected, the supervisor circuit 96 outputs a different digital code at 92, 93 and 94. These signals are provided to the voltage regulator 98 to cause the voltage regulator 98 to adjust its internal configuration, thereby adjusting a number of output voltage domains that it provides to the load assembly 108. Similarly, these signals are provided to the load assembly 108 to cause the load assembly 108 to adjust its internal configuration, thereby altering the configuration of the loads contained therein to improve an efficiency of using the power received from the voltage regulator 98. In some examples, an output of the OR gate 97 identifies whether either of the mode signals 92, 93 is high and, if so, provides a high input at the mode 2/mode 1 signal 92/93 at the load assembly 108. The contents and functionality of the supervisor circuit 96, the voltage regulator 98 and the load assembly 108 are described below.

Figure 1B:
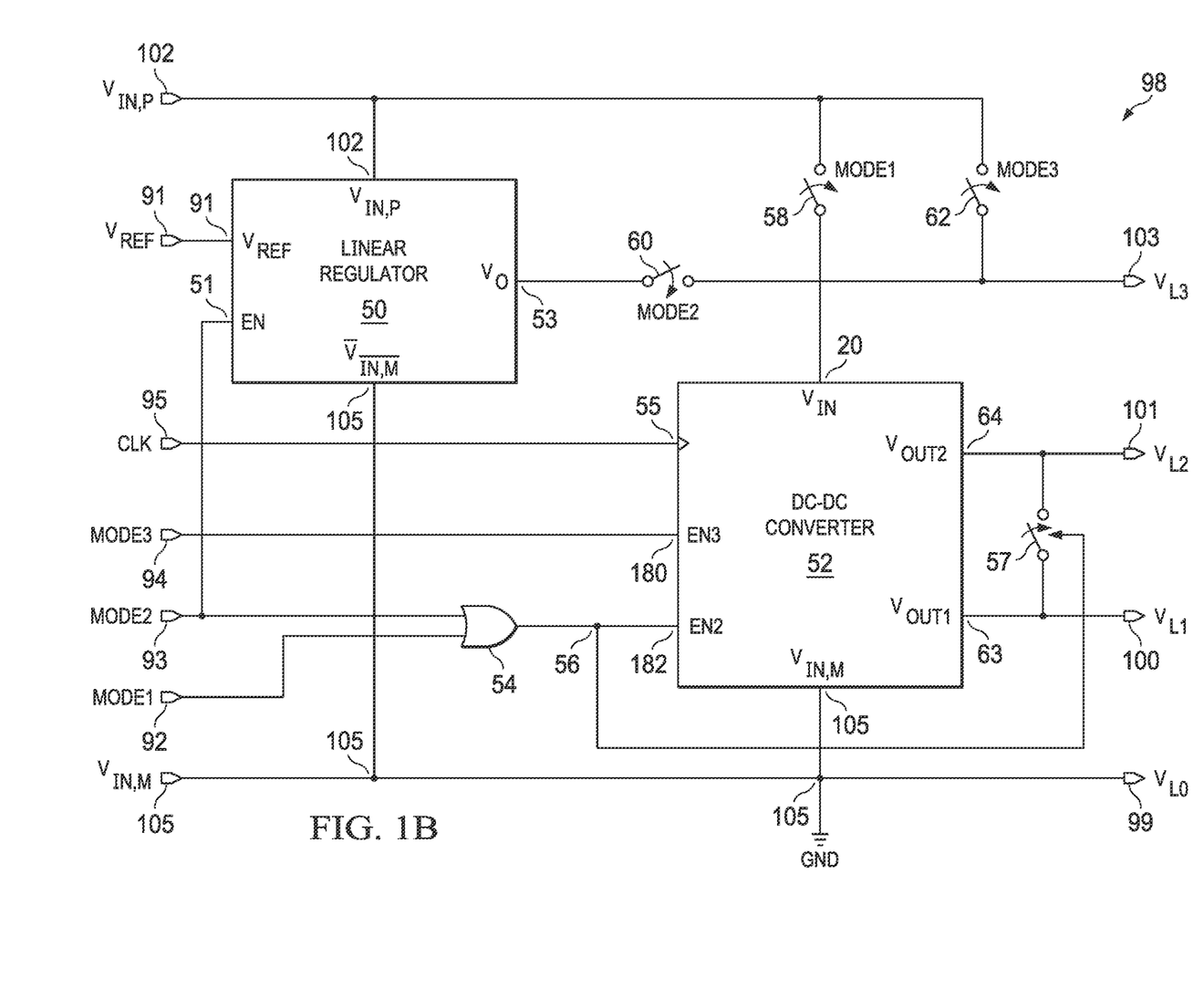
FIG. 1B is a circuit schematic diagram of an illustrative voltage regulator in accordance with various examples.

FIG. 1B is a schematic diagram of an illustrative voltage regulator 98. The voltage regulator 98 includes a linear regulator 50 and a DC-DC converter 52. Also, the voltage regulator 98 includes an OR gate 54 and switches 58, 60, 62 and 63. As depicted in FIG. 1A, the voltage regulator 98 receives input signals 91-95, 102 and 105. Also, as depicted in FIG. 1A, the voltage regulator 98 provides output signals 99, 100, 101 and 103. The switch 58 is controlled by the input signal 92, which corresponds to mode 1. The switch 60 is controlled by the input signal 93, which corresponds to mode 2. The switch 62 is controlled by the input signal 94, which corresponds to mode 3. The switch 57 is controlled by the output 56 of the OR gate 54.

The linear regulator 50 functions to step down the voltage provided by the battery supply 102 to the voltage regulator 98 and the load assembly 108 of FIG. 1 (such as using a pair of amplifiers, multiple current sources, and the reference signal 91). In some applications, the linear regulator 50 steps down the voltage provided by the battery supply 102, but only when the voltage regulator system 90 is operating in a specific mode. In the example shown, the linear regulator 50 is enabled when the voltage regulator system 90 is operating in mode 2, because the mode 2 signal 93 couples to an enable pin 51 of the linear regulator 50.

The DC-DC converter 52 converts the voltage received at pin 20 (i.e., either the battery supply 102 or the output of the linear regulator 50, according to the configuration of the switches 58, 60 and 62) to multiple voltage domains, using the clock signals 95 received at pin 55 and the mode signals received at pins 180 and 182. These multiple voltage domains exist between voltage outputs 103 and 101; between voltage outputs 101 and 100; and between voltage outputs 100 and 99. In this example, the DC-DC converter has only three voltage domains. But any number of voltage domains is possible in other examples. The operation of the voltage regulator 98 is described herein with respect to each of the three modes. However, the scope of example embodiments is not limited to three modes, and the operation of the voltage regulator 98 can be adjusted as necessary to accommodate fewer or mode modes, as desired.

When mode 1 has been selected by the supervisor circuit 96 (as described below with reference to FIG. 3), the mode 1 signal 92 is high, while the mode 2 signal 93 and the mode 3 signal 94 are low. As a result, the linear regulator 50 is disabled. Also, the output of the OR gate 54 is high, because the mode 1 signal 92 is high. Thus, the node 56 carries a high signal. This high signal is provided to the EN2 pin 182 of the DC-DC converter 52, while the EN3 pin 180 receives a low signal. This combination of inputs to the EN2 and EN3 pins 182, 180 causes the DC-DC converter 52 to operate in a particular manner, as described below. The high signal at node 56 is also provided to the switch 57, which closes as a result of the high signal, thus shorting the output voltage pins 63 and 64 together, as shown. Also, when mode 1 is selected, switch 58 is closed, while switches 60 and 62 are open. When the voltage regulator 98 operates in mode 1: (a) the voltage output 103 provides the battery supply 102; (b) the voltage outputs 100 and 101, which are shorted together, are provided at the output pins 63 and 64; and (c) the voltage output 99 provides a ground connection.

When mode 2 has been selected by the supervisor circuit 96 (as described below with reference to FIG. 3), the mode 2 signal 93 is high, while the remaining mode signals are low. As a result of the mode 2 signal 93 being high, the linear regulator 50 is enabled, and the output of the OR gate 54 at node 56 is high. Thus, the EN2 pin 182 and the switch 57 receive high signals, which is the same as when mode 1 is enabled. The EN3 pin 180 still receives a low signal. Also, when mode 2 is selected, switch 60 is closed, while switches 58 and 62 are open. When the voltage regulator 98 operates in mode 2: (a) the voltage output 103 provides a stepped-down voltage from the voltage output pin 53 of linear regulator 50; (b) the voltage outputs 100 and 101, which are shorted together, are provided at the output pins 63 and 64; and (c) the voltage output 99 provides a ground connection.

When mode 3 has been selected by the supervisor circuit 96, the mode 3 signal 94 is high, while the remaining mode signals are low. As a result of the mode 3 signal 94 being high, the EN3 pin 180 receives a high signal, while the EN2 pin 182 receives a low signal. Similarly, the linear regulator 50 is disabled. The output of the OR gate 54 at node 56 is low, so the switch 57 is open. Also, in mode 3, switch 62 is closed, while switches 58 and 60 are open. When the voltage regulator 98 operates in mode 3: (a) the voltage output 103 provides the battery supply 102; (b) the voltage output 101 provides the output of the pin 64; (c) the voltage output 100 is provided at the pin 63; and (d) the voltage output 99 provides a ground connection.

Figure 2A:
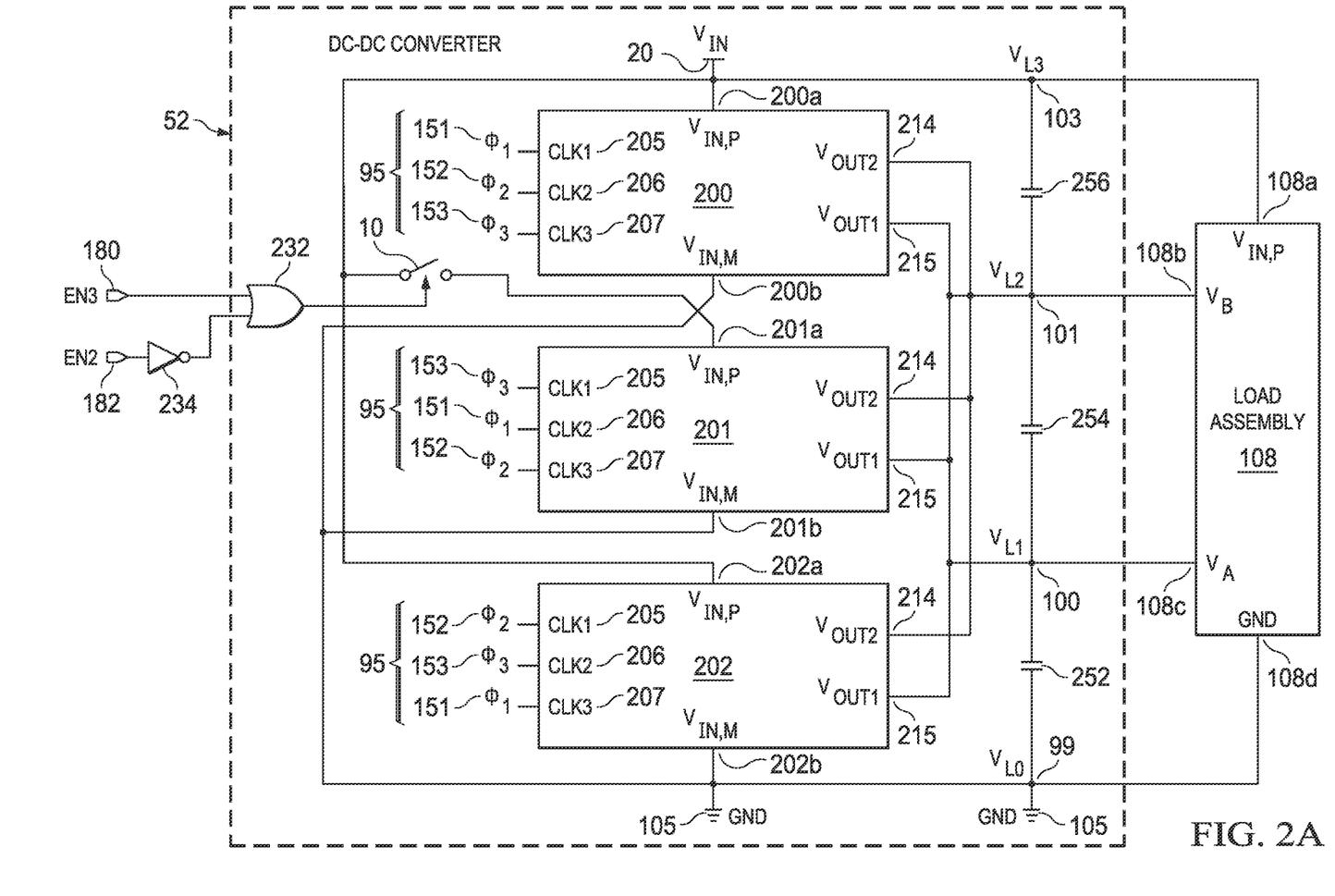
FIG. 2A is a circuit schematic diagram of a portion of an illustrative voltage regulator system in accordance with various examples.

FIG. 2A is a schematic diagram of an illustrative DC-DC converter 52 and an illustrative load assembly 108. The DC-DC converter 52 comprises multiple unit cells 200, 201 and 202, although the number of unit cells may vary, according to the application and the number of output voltage domains desired. This example has three illustrative output voltage domains (such as FIG. 1B, which has a first domain between voltage outputs 103 and 101, a second domain between voltage outputs 101 and 100, and a third domain between voltage outputs 100 and 99). Because this example has three voltage domains, it likewise has three unit cells. Also, the DC-DC converter 52 includes decoupling capacitors 252, 254 and 256. The unit cells 200, 201 and 202 and the decoupling capacitors 252, 254 and 256 are configured as shown in FIG. 2A. Nodes 103, 101, 100 and 99 couple to input pins 108a, 108b, 108c and 108d, respectively, of the load assembly 108.

The functionality of the unit cells 200-202 is described below. But generally, each of the unit cells includes a capacitor and switches that are controlled by multiple non-overlapping clock signals (e.g., clock signals 95 in FIG. 1A-1B), such that the capacitor is repeatedly charged and discharged. In some examples, only one of the unit cells 200-202 is charging its capacitor at a given time, while (at that time) the remaining unit cells are discharging their capacitors. To achieve this staggered charging and discharging of the capacitors of the unit cells 200-202, some examples have identically manufactured unit cells. Each unit cell has a respective set of input clock pins. The clock signals with non-overlapping phases are connected to the input clock pins of the unit cells in a round-robin manner.

For example, unit cell 200 has input clock pins 205, 206 and 207. Input clock pin 205 receives clock signal 151; input clock pin 206 receives clock signal 152; and input clock pin 207 receives clock signal 153. Unit cell 201 has input clock pins 205, 206 and 207, which are connected within the unit cell 201 in a functionally and/or structurally equivalent manner as in the unit cell 200. However, for unit cell 201, the input clock pins 205, 206 and 207 couple to clock signals 153, 151 and 152. Because the functionally equivalent clock pins for unit cells 200 and 201 receive different clock signals, the unit cells 200 and 201 behave differently when the clock signals are applied. Similarly, unit cell 202 has input clock pins 205, 206 and 207, which couple to clock signals 152, 153 and 151, respectively. In this way, the unit cells 200-202, although being manufactured virtually identically, behave differently in response to the same input clock signals, because the input clock signals are connected to the input clock pins differently. In some examples, identically manufactured unit cells are not used, but the connections between input clock pins and input clock signals ensure that the effect described above is nevertheless achieved. Each of the unit cells 200-202 generates a respective set of outputs, which correspond to a maximum number of voltage domains that are provided by the voltage regulator 98. In the example shown, each of the unit cells 200-202 provides two outputs, so the maximum number of voltage domains provided by the voltage regulator 98 is three (i.e., N+1 voltage domains, where N is the number of voltage outputs of each of the unit cells 200-202). As described above, the specific configurations shown in the drawings are merely illustrative. The principles disclosed in the drawings and described herein are extendible to any number of domains.

The unit cells 200-202 also receive power from the voltage received at pin 20, and they couple to ground 105. In modes 1 and 3, the voltage received at pin 20 is from the battery supply 102, due to the switching arrangement of the switches 58, 60 and 62. In mode 2, the voltage received at pin 20 is from the output pin 53 of the linear regulator 50. As shown, in some examples, the OR gate 232 connects or disconnects the voltage received at pin 20 to one or more of the unit cells 200-202 (i.e., enables or disables one or more unit cells 200-202), based on enable signals 180, 182 and an inverter 234. The enable signals 180, 182 are provided as described above.

As described above, each of the unit cells 200-202 includes a capacitor and multiple switches. The switches in each unit cell 200-202 couple to the capacitor and are opened and closed by the clock signals 151-153. According to the states of the switches in a unit cell, the capacitor in that unit cell will couple to either: (a) nodes 103 and 101; (b) nodes 101 and 100; or (c) nodes 100 and 99. The clock signals 151-153 are frequency-matched and phase-offset, so that (at any given time) only one unit cell 200-202 couples to each of the three pairs of nodes 103/101, 101/100, and 100/99 via its output pins. For example, at a given time, the unit cell 200 couples to nodes 103 and 101 via output pins 200a and 214, while the unit cell 201 couples to nodes 101 and 100 via output pins 214 and 215, and while the unit cell 202 couples to nodes 100 and 99 via output pins 215 and 202b. According to the clock signals 95, this configuration may change, so that different unit cells couple to different nodes 103, 101, 100 and 99. The unit cell that couples to the nodes 103 (i.e., pin 20) and 101 at any given time is charging its capacitor, while the remaining unit cells (which couple to the nodes 101/100 and 100/99) are discharging. Thus, at any given time, only one of the unit cells 200-202 is charging, while the remaining unit cells are discharging. In some examples, for each capacitor, the amount of charge accumulated due to charging is discharged in one clock cycle. Charging only one unit cell at a time mitigates peak currents, as described above, on the battery supply, thus extending battery life compared to other voltage regulation systems that do not implement the techniques described herein. Decoupling capacitors 256, 254 and 252 are provided to power their respective voltage domains when the switches (shown in FIG. 2B) switch states (i.e., with each change in clock phase). Because the amount of time necessary for the switches in FIG. 2B to switch states is relatively small, the decoupling capacitors 256, 254 and 252 are not needed for long periods of time, so the decoupling capacitors 256, 254 and 252 are relatively small.

The nodes 103, 101, 100 and 99 couple to input pins 108a-108d, respectively, of the load assembly 108. Thus, the voltage formed across nodes 103 and 101 by the unit cells coupling to those nodes at any given time is provided to pins 108a and 108b of the load assembly 108. Similarly, the voltage formed across nodes 101 and 100 by the unit cells coupling to those nodes at any given time is provided to pins 108b and 108c of the load assembly 108. Likewise, the voltage formed across nodes 100 and 99 by the unit cells coupling to those nodes at any given time is provided to pins 108c and 108d of the load assembly 108.

As described above, it may be desirable (in some cases) to adjust the number of voltage domains provided by the DC-DC converter 52. For example, as the battery supplying the battery supply 102 ages, the voltage of the battery supply 102 may decrease, thus reducing the effective voltage range that may be divided into multiple useful voltage domains. Accordingly, the OR gate 232 receives: (a) the mode 3 signal 94 via the pin 180 (FIG. 1B); and (b) an output of the inverter 234. The inverter 234 has an input to receive the signal from node 56 via the pin 182 (FIG. 1B). The signal received via pin 182 is inverted by the inverter 234, and the output of the inverter 234 is provided to the OR gate 232. The output of the OR gate 232 controls a mode switch 10 that connects and disconnects the pin 201a of unit cell 201 to the pin 20. Thus, when mode 3 is enabled, the mode switch 10 is closed. But when either mode 1 or mode 2 is enabled, the mode switch 10 is open. When mode switch 10 is closed, all three unit cells 200-202 are active. But when mode switch 10 is open, only two unit cells 200, 202 are active. When all three unit cells 200-202 are functional, four voltage domains are provided to the load assembly 108. When two unit cells 200, 202 are active, three voltage domains are provided to the load assembly 108. When only two unit cells are active, the number of clock signals 95 (and the number of phases provided by those clock signals 95) also changes. Accordingly, in some examples, the output of the OR gate 232 is provided to the clock (not expressly shown) that generates the clock signals 95. In response to receiving an indication of more or fewer active unit cells than the number of currently active unit cells, the clock may respond by increasing or decreasing the number of clock signals (and clock phases) provided to the unit cells. The clock also may respond by increasing or decreasing the pulse width of each clock phase. In some examples, when in mode 2 or mode 1, the clock pins 206 in the unit cells 200-202 are disabled.

Figure 2B:
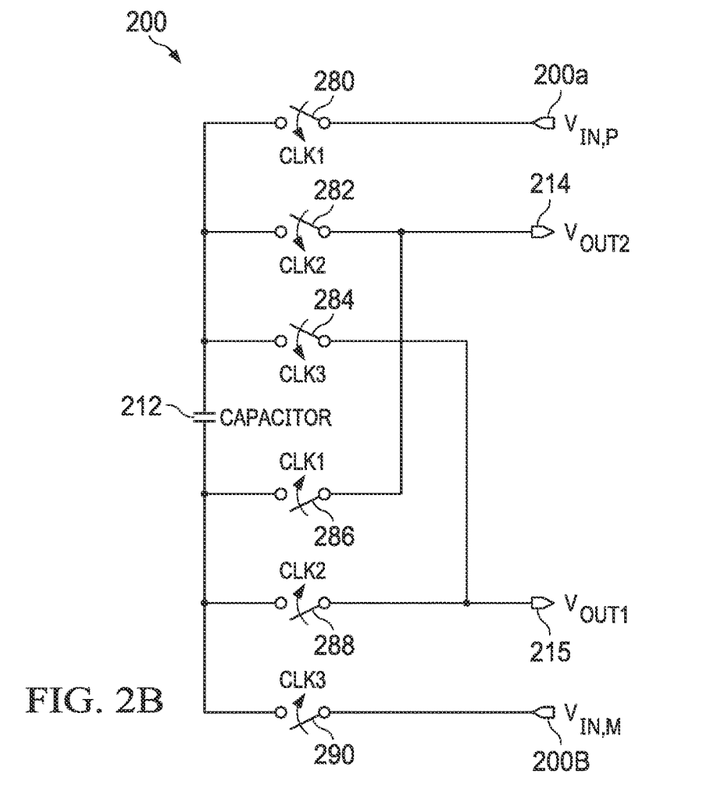
FIG. 2B is a circuit schematic diagram of an illustrative single unit cell of a voltage regulator system in accordance with various examples.

FIG. 2B depicts the contents of an illustrative unit cell 200. In some examples, the contents of the other unit cells are identical to those depicted in FIG. 2B. The illustrative unit cell 200 comprises a capacitor 212 whose capacitance value may be selected as desired. One plate of the capacitor 212 couples to three switches 280, 282 and 284, which may comprise any suitable type of switch, such as a transistor. The switch 280 is controlled by the clock signal that is received at pin 205, such as clock signal 151 in the case of unit cell 200. In the case of unit cells 201 and 202, such a switch is controlled by different clock signals. The switch 282 is controlled by the clock signal received at pin 206, such as clock signal 152 in the case of unit cell 200. The switch 284 is controlled by the clock signal that is received at pin 207, such as clock signal 153 in the case of unit cell 200. The other plate of the capacitor 212 couples to three switches 286, 288 and 290. Switches 286, 288 and 290 are controlled by the clock signals that are received at pins 205, 206 and 207, respectively (such as clock signals 151, 152, and 153, respectively, in the case of unit cell 200).

Switches that are controlled by the same clock signals are considered to belong to a pair. For example, switches 280 and 286 form a pair, because they are both controlled by the same clock signal 151. Similarly, switches 282 and 288 form a pair, and switches 284 and 290 form another pair. At any given time, one pair of switches is closed, while the remaining pairs of switches are open. For example, when clock signal 151 is high, the capacitor 212 couples to pins 103 and 101 via pins 200a and 214, respectively. The capacitor 212 makes no other electrical connections, because the other two pairs of switches are open. Similarly, when clock signal 152 is high, the capacitor 212 couples to nodes 101 and 100 via pins 214 and 215, respectively. Similarly, when the clock signal 153 is high, the capacitor 212 couples to nodes 100 and 99 via pins 215 and 200b, respectively.

Figure 3:
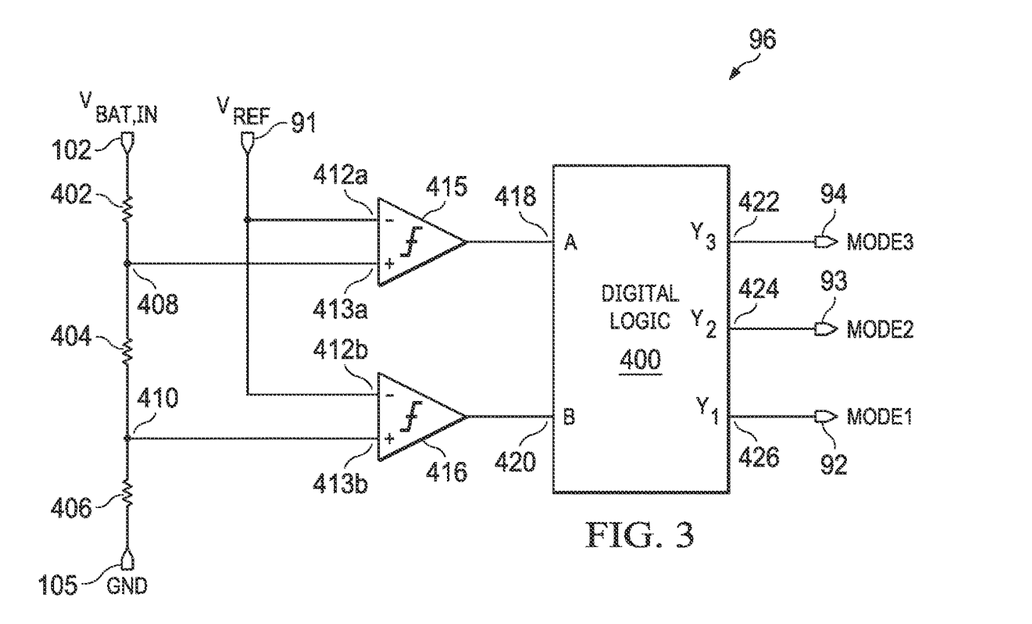
FIG. 3 is a circuit schematic diagram of an illustrative supervisor circuit in a voltage regulator system in accordance with various examples.

FIG. 3 shows a circuit schematic diagram of a supervisor circuit 96 in the voltage regulator system 90 of FIG. 1A in accordance with various examples. As described above, the supervisor circuit 96 determines the mode that is to be implemented in the voltage regulator system 90 at any given time. In some examples, the supervisor circuit 96 receives: the battery supply 102; GND 105; a digital logic 400; a resistor network 402, 404, and 406; and a pair of comparators 415 and 416. The supervisor circuit 96 also includes: node 408 between resistors 402 and 404; node 410 between resistors 404 and 406; inverting input 412a and non-inverting input 413a to comparator 415; inverting input 412b and non-inverting input 413b to comparator 416; input pins 418 and 420 to digital logic 400; and output pins 422, 424 and 426 from the digital logic 400. Output pins 422, 424 and 426 provide mode 3 signal 94, mode 2 signal 93, and mode 1 signal 92, respectively. The supervisor circuit 96 also receives the reference voltage 91.

In operation, the supervisor circuit 96 is on and is powered by the battery supply 102. The supervisor circuit 96 tracks the battery supply 102 and determines which mode should be implemented, based on the battery supply 102 and the reference voltage 91. More specifically, the resistor network operates as a voltage divider to provide divided voltages at nodes 408 and 410, based on the battery supply 102. In some examples, the resistor 402 is three times the resistance of the resistor 404, and the resistor 406 is two times the resistance of the resistor 404. The comparators 415 and 416 compare the voltages at nodes 408 and 410 to the reference voltage 91 and output signals to the pins 418 and 420 accordingly. The digital logic 400 comprises any suitable logic configured to select a mode based on the signals at pins 418 and 420. For example, if the battery supply 102 is in the range of 3.65 V-3.5 V (voltage at node 410 is >1.167 V), then the mode 3 signal 94 is asserted at the output pin 422 of the digital logic 400. If the battery supply 102 is in the range of 3.5 V-2.5 V (voltage at node 410 is <1.167 V, and voltage at node 408 is >=1.25 V), then the mode 2 signal 93 is asserted at the output pin 424 of the digital logic 400. However, if the battery supply 102 is in the range of 2.5 V-2.35 V (voltage at node 408 is <1.25 V), then the mode 1 signal 92 is asserted at the output pin 426 of the digital logic 400. The output of the digital logic 400 is then provided as the input to the voltage regulator 98 and the load assembly 108 of the voltage regulator system 90.

Figure 4:
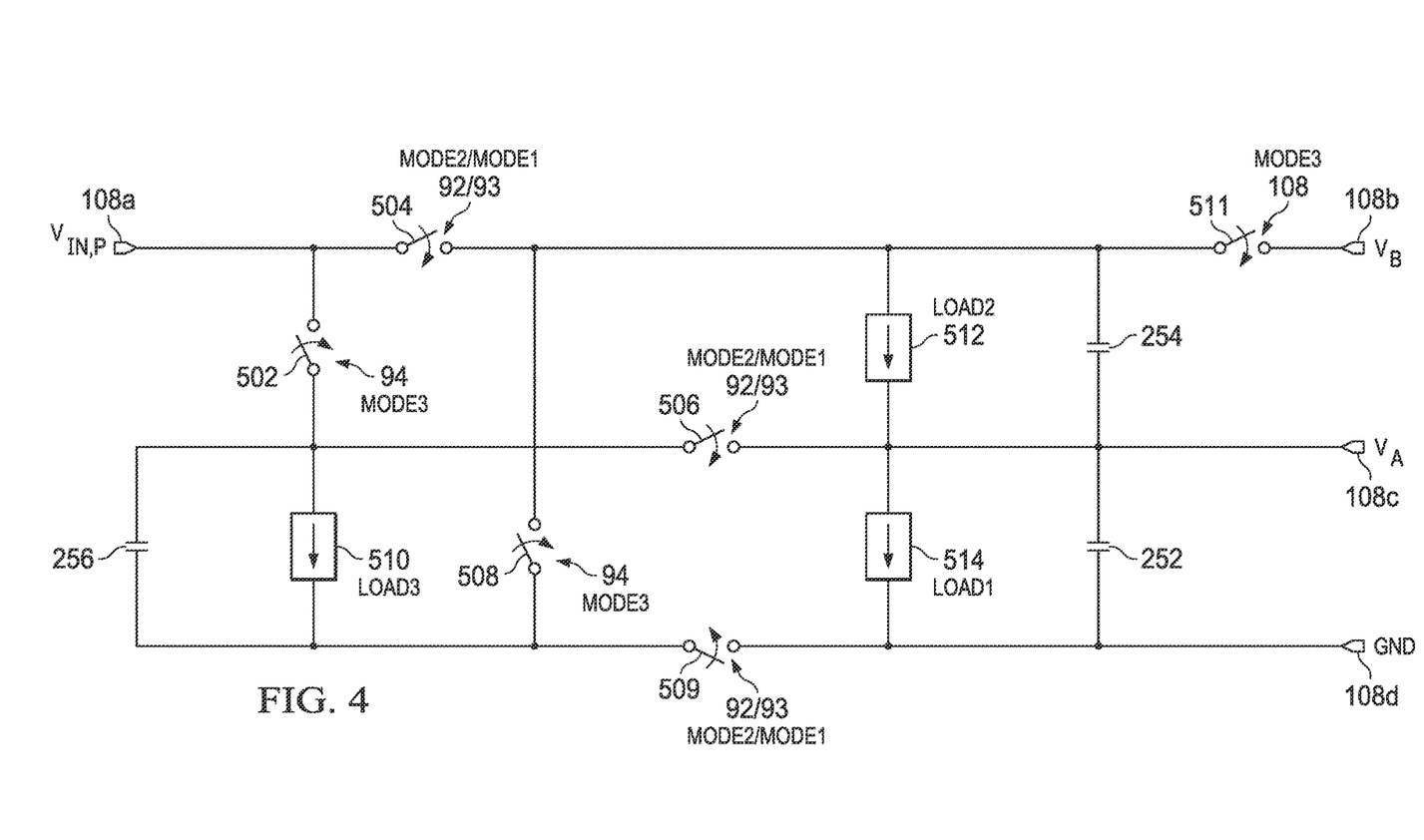
FIG. 4 is a circuit schematic diagram of a load assembly in accordance with various examples.

FIG. 4 depicts an illustrative load assembly 108 in accordance with various examples. The load assembly 108 comprises multiple loads, such as loads 510, 512 and 514. These loads may be any type of load that can be powered by the battery supply 102. The load assembly 108 also comprises switches 502, 504, 506, 508, 509 and 511. Also, the load assembly 108 includes decoupling capacitors 252, 254 and 256. The load assembly 108 receives as inputs the voltage outputs 103, 101, 100 and 99 of the voltage regulator 98 at input pins 108a, 108b, 108c and 108d, respectively. Further, the load assembly 108 receives as inputs: (a) the output of the OR gate 97 (FIG. 1A) to control switches 504, 506 and 509; and (b) the mode 3 signal 94 to control switches 502, 508 and 511. The switches are controlled according to the mode signals to implement different configurations, so that the loads 510, 512 and 514 are provided with the voltages at pins 108a-108d in different ways. For example, in mode 3, the configuration of the load assembly 108 may cause the loads 510, 512 and 514 to each receive a different voltage from a separate voltage domain. In other examples, the load assembly 108 may be configured to couple two of the loads 510, 512 and 514 in parallel, while the other load is not coupled in parallel, thereby enabling the three loads 510, 512 and 514 to receive sufficient power for proper operation with a reduced battery supply (i.e., using fewer voltage domains).

Operation of the voltage regulator system 90, as a whole, is described herein with reference to FIGS. 1A through 4. The voltage regulator system 90 receives a battery supply 102 from a battery. The battery supply 102 and the reference voltage 91 are provided to the supervisor circuit 96, which uses a resistor network, multiple comparators 415 and 416, and a digital logic 400 (FIG. 3) to determine which mode should be implemented at any given time. The supervisor circuit 96 provides mode signals to the voltage regulator 98 and the load assembly 108 to indicate the selected mode. The voltage regulator 98 uses the mode signals to enable a specific number of unit cells which, in turn, causes a specific number of voltage domains to be output by the voltage regulator 98. The unit cells 200-202 in the voltage regulator 98 include capacitors, which are alternatingly charged and discharged based on a switching network that is controlled by the clock signals 95. By charging only one (or a limited number) of capacitors at a time, the current draw peaks are mitigated, thus extending battery life. The capacitors of the unit cells 200-202 provide output voltages to the load assembly 108. The output voltages provided by the unit cells form a specific number of voltage domains, and the number of voltage domains, as described above, depends on the mode that is currently enabled. The load assembly 108 receives the mode signals and configures its loads to receive the voltages they require to operate properly and efficiently. In a case where the currently enabled mode causes three voltage domains to be output (usually when the battery supply 102 is relatively high), the load assembly 108 configures its loads to receive and operate using three voltage domains. In a case where the currently enabled mode causes only two voltage domains to be output (usually when the battery supply 102 is relatively low), the load assembly 108 configures its loads to receive and operate using only two voltage domains. Some modes may cause the voltage regulator 98 to output two voltage domains, but in some of those modes, the linear regulator 50 may be enabled to adjust the voltage levels provided to the load assembly 108.

Figure 5:
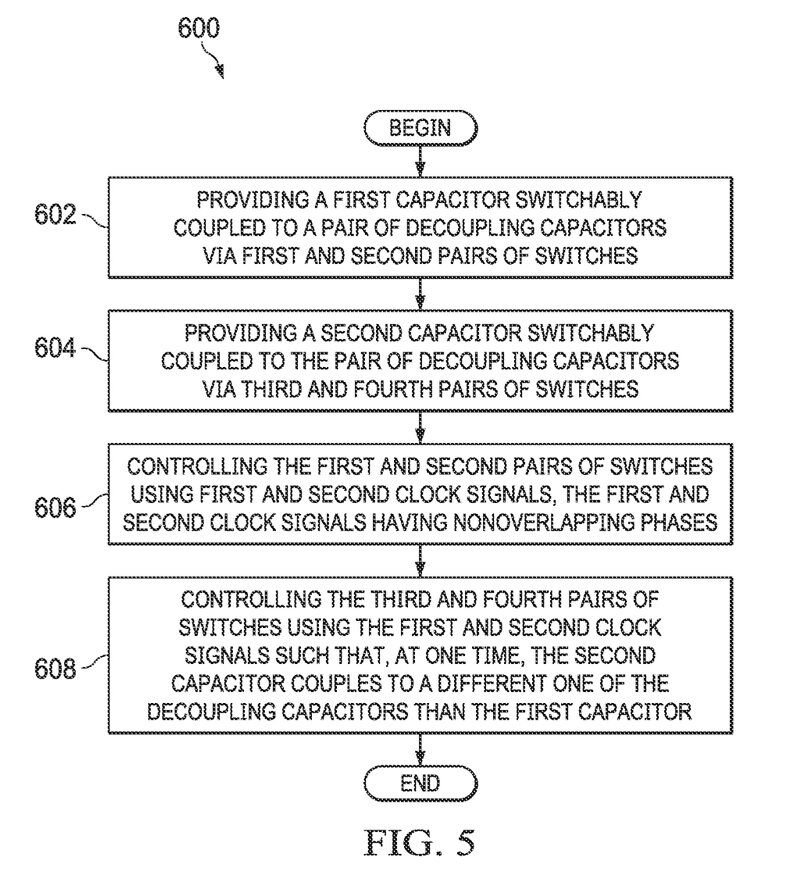
FIG. 5 is a flow diagram of an illustrative method in accordance with various examples.

FIG. 5 depicts a flow diagram of an illustrative method 600 in accordance with various examples. The method 600 begins with switchably coupling a first capacitor to a pair of decoupling capacitors via first and second pairs of switches (step 602). The method 600 also comprises switchably coupling a second capacitor to the pair of decoupling capacitors via third and fourth pairs of switches (step 604). The method further comprises controlling the first and second pairs of switches using first and second clock signals, the first and second clock signals having non-overlapping phases (step 606). The method additionally includes controlling the third and fourth pairs of switches, using the first and second clock signals, to couple the first and second capacitors to different ones of the decoupling capacitors (step 608). The method 600 may be modified as desired, including by adding, deleting, modifying or rearranging one or more steps. The method 600 addresses the situation in which two voltage domains are provided, but the steps of the method 600 may easily be adapted for any number of voltage domains.

In this description, the term "couple" or "couples" means either an indirect or direct connection. Thus, if a first device couples to a second device, that connection may be through a direct connection or through an indirect connection via other devices and connections.

Modifications are possible in the described embodiments, and other embodiments are possible, within the scope of the claims.

What is claimed is:

1. A system comprising:
    a first unit cell having outputs and a first capacitor, the first unit cell comprising first switches coupled between the first capacitor and the outputs of the first unit cell, in which the first unit cell is switchably coupled to a voltage supply terminal, and the first switches: have a first arrangement relative to the first capacitor; and are configured to have a first set of states responsive to a trio of clock signals having non-overlapping phases;
    a second unit cell having outputs and a second capacitor, the second unit cell comprising second switches coupled between the second capacitor and the outputs of the second unit cell, in which the second unit cell is switchably coupled to the voltage supply terminal, and the second switches: have a second arrangement relative to the second capacitor, in which the second arrangement is different from the first arrangement; and are configured to have a second set of states responsive to the trio of clock signals;
    a third unit cell having outputs and a third capacitor, the third unit cell comprising third switches coupled between the third capacitor and the outputs of the third unit cell, in which the third unit cell is switchably coupled to the voltage supply terminal, and the third switches: have a third arrangement relative to the third capacitor, in which the third arrangement is different from the first and second arrangements; and are configured to have a third set of states responsive to the trio of clock signals;
    a load assembly coupled to the first, second and third unit cells, in which the load assembly has a mode input and is configured to use power from the first, second and third unit cells based on the mode input;
    a trio of decoupling capacitors, in which at least one of the trio of decoupling capacitors is switchably coupled to the voltage supply terminal; and
    a linear regulator coupled to the voltage supply terminal.

2. The system of claim 1, wherein the mode input is a first mode input, the linear regulator has a second mode input, the linear regulator is selectively enabled based on the second mode input, and the second mode input indicates which of the first, second and third unit cells is disabled.

3. The system of claim 2, further comprising logic having multiple mode inputs, the logic configured to activate or deactivate the second unit cell based on the multiple mode inputs.

4. The system of claim 1, wherein the load assembly comprises fourth switches.

5. The system of claim 4, wherein the load assembly is configured to control the fourth switches based on the mode input.

6. The system of claim 1, wherein the first switches include first, second and third pairs of switches, the first pair is controllable by a first clock signal of the trio of clock signals, the first clock signal has a first phase, and switches of the first pair are coupled to each other via the first capacitor.

7. The system of claim 6, wherein the second pair is controllable by a second clock signal of the trio of clock signals, the second clock signal has a second phase, and switches of the second pair are coupled to each other via the first capacitor.

8. A voltage regulator comprising:
a capacitor;
a first pair of switches controllable by a first clock signal having a first phase, in which the switches in the first pair are coupled to each other via the capacitor; and
a second pair of switches controllable by a second clock signal having a second phase that is non-overlapping with the first phase, in which the switches in the second pair are coupled to each other via the capacitor, and a first switch in the first pair is directly coupled to a second switch in the second pair.

* * * * *